Dec. 21, 1937.  L. T. ELIEL  2,102,587
SOLAR NAVIGATOR
Filed Nov. 10, 1936   6 Sheets-Sheet 1

INVENTOR
LEON T. ELIEL
BY
Fred W. Harris
ATTORNEY.

Dec. 21, 1937.                L. T. ELIEL                2,102,587
                           SOLAR NAVIGATOR
                         Filed Nov. 10, 1936        6 Sheets-Sheet 3

INVENTOR
LEON T. ELIEL
BY
ATTORNEY.

Dec. 21, 1937.  L. T. ELIEL  2,102,587

SOLAR NAVIGATOR

Filed Nov. 10, 1936  6 Sheets-Sheet 4

INVENTOR
LEON T. ELIEL
BY
Ford H. Harris
ATTORNEY.

Dec. 21, 1937.   L. T. ELIEL.   2,102,587
SOLAR NAVIGATOR
Filed Nov. 10, 1936   6 Sheets-Sheet 5

INVENTOR
LEON T. ELIEL
BY

ATTORNEY.

Dec. 21, 1937.　　　　　L. T. ELIEL　　　　　2,102,587
SOLAR NAVIGATOR
Filed Nov. 10, 1936　　　6 Sheets-Sheet 6

INVENTOR
LEON T. ELIEL
By

ATTORNEY.

Patented Dec. 21, 1937

2,102,587

UNITED STATES PATENT OFFICE 2,102,587

SOLAR NAVIGATOR

Leon T. Eliel, Pasadena, Calif.

Application November 10, 1936, Serial No. 110,083

21 Claims. (Cl. 33—61)

My invention relates to navigation instruments, and relates in particular to a navigator for aerial vehicles having means for reference to the sun and to the ground for maintaining an established or selected course of travel.

Although the utility of my invention is not limited, its present greatest value is in the navigation of airplanes employed in aerial map making, wherein it is desirable to fly a course consisting of a straight line to a degree of accuracy beyond the ability of the ordinary pilot without specialized instruments. The conventional instruments ordinarily found on the panel of the airplane or other aerial vehicle do not give the precision necessary for straight course flying. The compass, for example, indicates only the direction in which the airplane is headed and does not take into consideration factors which enter into the determination of the movement of the aerial vehicle relative to the earth, for example, drift and changes in wind direction and velocity, which the pilot can only compute. This instrument is suitable for flight from town to town where the departure of a few miles from the absolutely straight course between the towns is of no great consequence, but for the reasons set forth above compasses are not sufficient for producing the type of flying required in aerial map photography, the result being that pilots engaged in this activity have had to depend upon instinct and such instruments as have been available, such, for example, as drift indicators.

It is an object of the present invention to provide a navigating device by which greater precision in the adherence to a desired course may be obtained.

It is an object of the invention to provide a navigator for aerial vehicles having a ground reference member adapted to indicate the direction in which the aircraft is moving over the ground, and means cooperating with the ground reference member for imparting information to the pilot of the aerial vehicle when the direction of travel over the ground varies from the desired course, thereby enabling the pilot to correct his direction and condition of flight.

It is also an object of the invention to provide an aerial navigator of the character described having a sun reference member cooperating with a ground reference member adapted to be adjusted relative to objects visible on the ground, the sun reference member and the ground reference member being connected together so that movement of the ground reference member to adjust it in a desired relationship to the ground will be imparted to the sun reference member. In the preferred practice of the invention hereinafter disclosed, the sun reference member comprises a solar compass adapted to receive rays from the sun, and having therein light responsive signal means which will cooperate in the production of sensible signals for guidance of the pilot as the result of the change of position or condition of sun's rays received within the solar compass structure.

It is a further object of the invention to provide a device of the character set forth in the preceding paragraph having a solar compass connected with a ground reference member, and means for adjusting the solar compass for use in different latitudes and longitudes, and having a convenient means for making latitude and longitude adjustments during flight of the aerial vehicle in which the navigator is mounted.

It is a further object of the invention to provide a navigator including a solar compass and a ground reference member, together with means for so mounting the solar compass that in proper straight line flying of the aerial vehicle the sun compass will be directed at the sun in a manner to receive sun's rays in a prescribed position, the ground reference member being adjustably connected to the sun compass so that it may be set at a desired course when the sun compass is in a position to receive rays from the sun, and signal means operating automatically when the sun compass is moved from the herein stated position, such signals providing information for guidance of the pilot in the operation of the aerial vehicle.

It is a further object of the invention to provide a sun compass with a remote direction indicator for use as a precision compass for general use.

It is a further object of the invention to provide a means of determining latitude and longitude from a single solar observation.

Further objects and advantages of the invention will be made evident throughout the following part of the specification.

Referring to the drawings, which are for illustrative purposes only.

Figures 1, 3, 4:
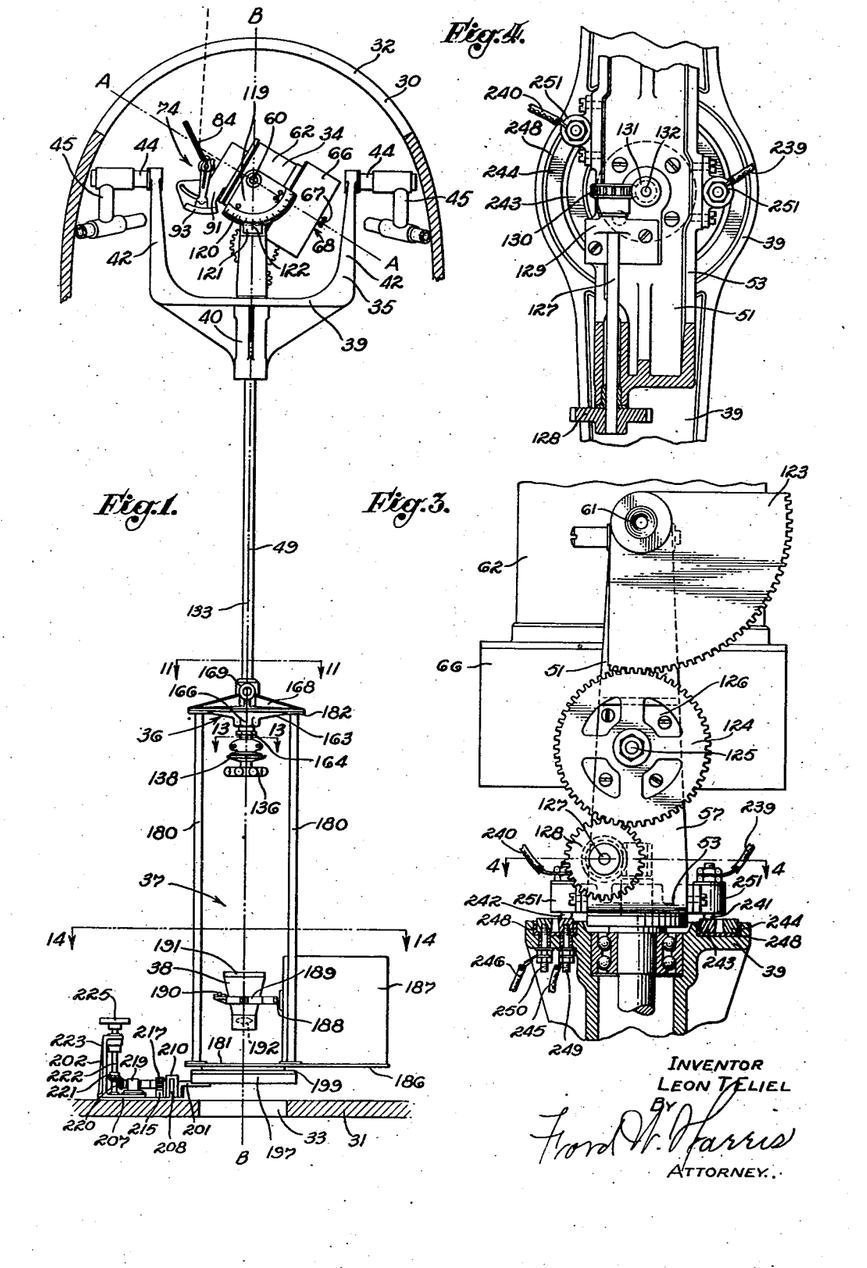
Fig. 1 is an assembly view showing a manner in which the solar navigator may be mounted on an aerial vehicle, certain parts being rotated out of their normal operating positions so that they may be readily seen.
Fig. 3 is a view, partly in section, taken substantially as indicated by the line 3—3 of Fig. 2.
Fig. 4 is a fragmentary sectional view taken as indicated by the line 4—4 of Fig. 3.

To illustrate a manner in which my device may be mounted in an aerial vehicle, in Fig. 1 I show a roof 30 and a floor 31 of an airplane fuselage, there being vertically aligned openings 32 and 33 respectively in the roof and floor members 30 and 31. The navigator includes a clock-driven sun compass 34 having adjustment means which will be later described in detail, means preferably including a yoke 35 for supporting the sun compass 34 so that it may be rotated on a vertical axis, a course determining means 36 adapted to be set to the azimuth of the course to be followed, and a course checking means 37 including a ground sight 38 which will show whether or not the determined course is being followed or whether the aerial vehicle is drifting from its intended course.

Figure 2:
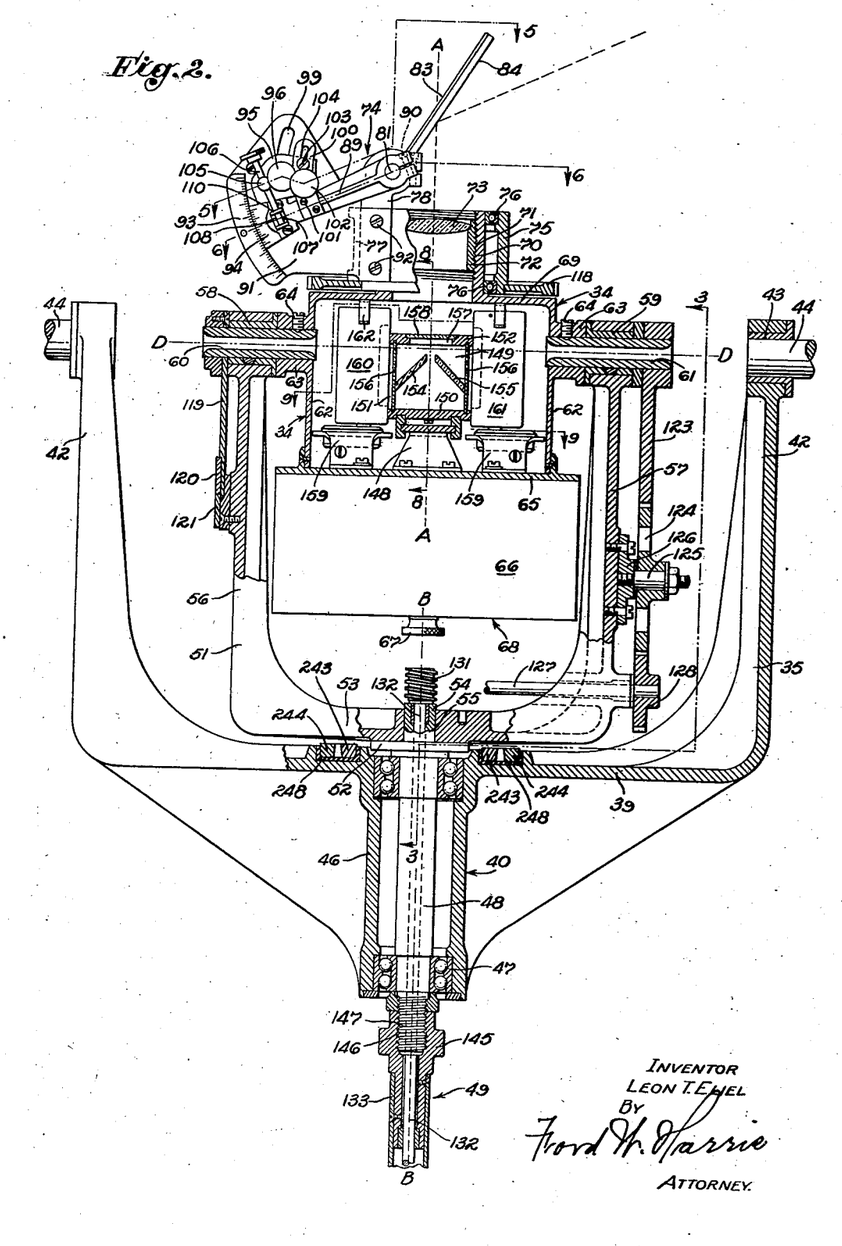
Fig. 2 is an enlarged, partly sectioned view of the head of the device, with certain parts thereof rotated out of their normal positions of operation so that these parts may be clearly seen.

The yoke 35, as best shown in Figs. 1 and 2, comprises a bottom wall 39 having a centralized bearing member 40 which under proper conditions of operation of the navigator is on a vertical axis, and a pair of arms 42 extending upwardly from the ends of the bottom wall 39 and having openings 43 in the upper ends thereof adapted to receive horizontally aligned shaft members 44 forming a part of the head support 45 for the navigator. As shown in Fig. 2, the bearing member 40 has a wall 46 carrying frictional bearings 47 supporting a sleeve 48 which forms the upper part of a vertical column or hollow shaft 49 which supports the elements 36 and 37 and connects the same to a yoke 51 in which the sun compass 34 is swung in an adjustable manner. The upper end of the sleeve 48 has a flange or collar 52 which rests against the bottom wall 53 of the yoke 51. Connection is made between the yoke 51 and the sleeve 48 by a stem 54 which has a shrink or press fit in an opening 55 in the bottom wall 53 of the yoke 51. The yoke 51 includes a pair of arms or forks 56 and 57 extending upwardly from the ends of the bottom wall 53. The upper ends of the arms 56 and 57 have horizontally aligned bearings 58 and 59 which receive hollow shafts 60 and 61 which project outwardly from a casing 62 of the sun compass 34. The inner ends of the shafts 60 and 61 are fixed in bosses 63 projecting outwardly from the casing 62 by means of set screws 64. The lower end of the casing 62 is closed by a wall 65, and to this wall a clock 66 is secured so that it will form a part of the sun compass structure.

The clock 66 is preferably of spring driven type and has a setting knob 67 projecting centrally from the face 68 thereof, this knob 67 being preferably mounted on the shaft of the clock which carries the minute hand, whereby the setting of the knob will directly move the minute hand from one position to another.

Figure 5:
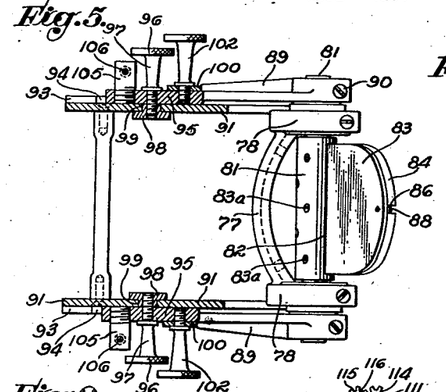
Fig. 5 is an enlarged, partly sectioned view taken as indicated by the line 5—5 of Fig. 2.
Figure 6:
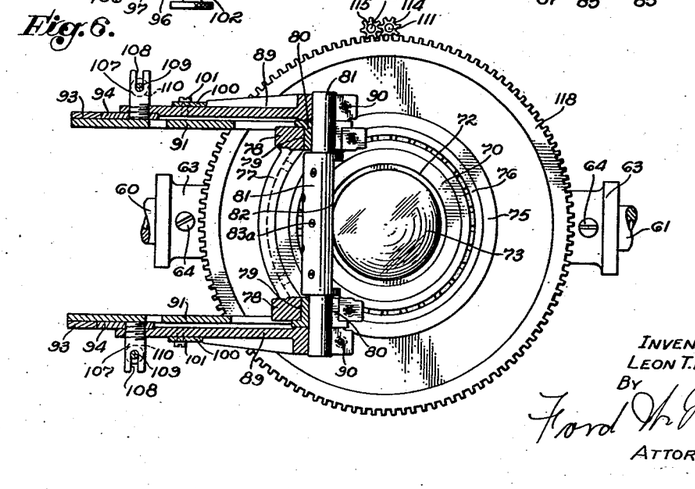
Fig. 6 is an enlarged, partly sectioned view taken as indicated by the line 6—6 of Fig. 2.
Figure 7:
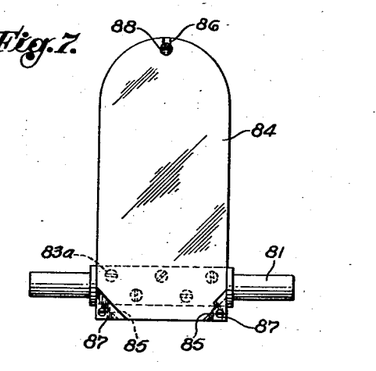
Fig. 7 is an enlarged face view of the mirror of the sun compass.

The casing 62 has a top or front wall 69 from the center of which a tubular wall 70 projects. This tubular wall 70 has internal threads 71 which adjustably receive a lens supporting member 72 carrying a lens 73 defining an optical axis A—A extending axially with respect to the casing 62 and the wall 70. A mirror support 74 is mounted on the wall 70 so as to revolve around the axis A—A, and includes a ring 75 which is mounted on the tubular wall 70 by bearings 76. A bracket 77, Figs. 2, 5, and 6, is connected to the ring 75, and forks 78 project from the bracket 77 in parallel relation to the axis A—A. The outer ends of the forks 78 have openings 79 disposed in a plane normal to the axis A—A, these openings 79 receiving flanged bushings 80 which carry a mirror or reflector shaft 81 which is flattened on one side thereof, as indicated by 82, so that the inner end of the mirror supporting plate 83 may be secured thereto by the use of screws 83a. A mirror or sun reflector 84 is employed having relieved corners 85 at one end thereof and a notch 86 at the opposite end thereof. The mirror 84 is held against the face of the plate 83 by means of clips 87 which fit the corners 85 of the mirror and a screw 88 which passes through the notch 86 thereof. For the adjustment of the mirror 84, duplicate means are provided for rotating the shaft 81 on its axis. Each of such means includes a lever 89 which may be locked upon an end of the shaft 81 by means of a locking screw 90. Cooperating with each of the levers 89 is a plate 91 secured to a bracket fork 78 by means of screws 92. Each plate 91 is provided with a scale 93 graduated to forty half-degrees on each side of a zero point. Each lever 89 has a cooperating vernier scale 94, and when the zero point of the vernier scale 94 coincides with the zero point of its cooperating scale 93, the shaft is adjusted by rotation to bring the mirror 84 into a position crossing the axis A—A at an angle of 45°. Each lever 89 has an adjusting and locking means consisting of a plate 95 which slides across the face of the cooperating plate 91 and is adapted to be locked against the face of such plate 91 by a locking bolt means 96 including a screw 97 and a nut 98 which travels along an arcuate slot 99 in the cooperating plate 91. A slotted plate 100, of arcuate form, is secured to each lever 89 by means of screws 101 in a position to extend over one portion of a plate 95, there being a locking screw 102 and a guide screw 103 extended through the slot 104 of the plate 100 into threaded engagement with the cooperating plate 95. Each plate 95 carries a post or stud 105 through which a vernier adjustment screw is threaded, and each lever 89 has mounted thereon a post 107 having a slot 108 in its outer end through which an end portion 109 of a vernier adjustment screw 106 passes, there being collars 110 on the end portion 109 to engage opposite sides of the post 107. Before adjusting the mirror 84 to a desired position of use, all of the screws 97 and 102 are loosened so that as the levers 89 are swung, the plates 95 will slide upon the plates 91. The levers are then swung to approximately the desired position, and one of the locking screws 97 is tightened. Then the vernier adjustment screw 106 adjacent the locking screw 97 which has been tightened is operated to move the levers into a final position of adjustment, after which the remaining screws 97 and 102 are tightened.

Figure 8:
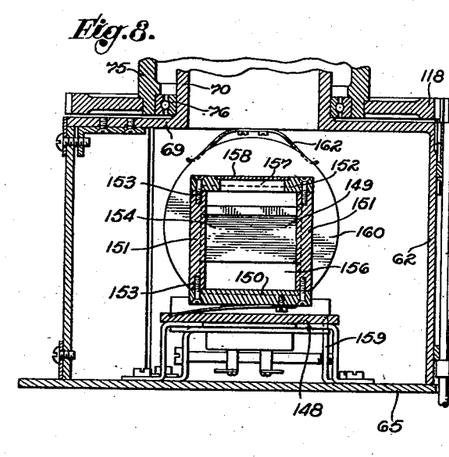
Fig. 8 is an enlarged sectional view taken as indicated by the line 8—8 of Fig. 2.
Figure 9:
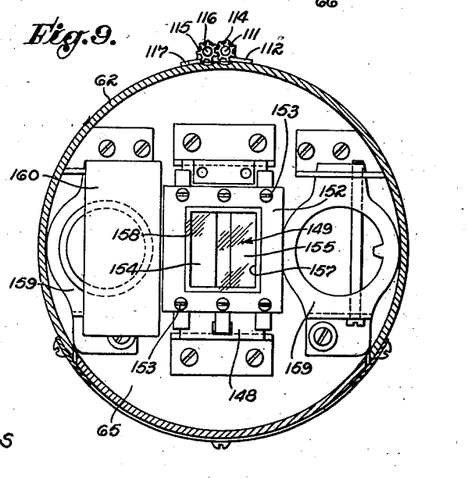
Fig. 9 is an enlarged sectional view taken as indicated by the line 9—9 of Fig. 2.
Figure 10:
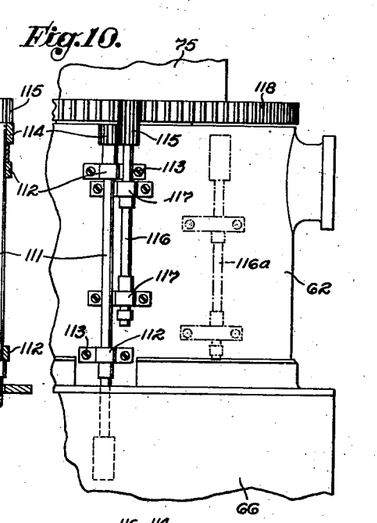
Fig. 10 is a fragmentary elevation of Fig. 8.

As shown in Figs. 8, 9, and 10, a drive shaft 111 projects from the clock 66 and across the outer face of the casing 62. This shaft is supported by bearing members 112 which are secured to the casing 62 by screws 113. A small gear 114 on the upper end of the shaft 111 engages an idler gear 115 mounted on the upper end of a shaft 116 carried by bearing members 117. The upper part of the idler gear 115 engages a gear 118 which is secured to the lower portion of the ring 75, so that the mirror support 74 will be rotated by the clock 66 to keep the mirror 84 pointed at the sun during the operation of the navigator in one hemisphere. When the navigator is used in the other hemisphere, the direction of rotation of the mirror support 74 must be reversed. This is accomplished by moving the shaft 116 and the gear 115 to the position indicated by dotted lines 116a, and then moving the shaft 111 upwardly so that the gear 114 at the upper end thereof will engage the gear 118 directly instead of through an idler.

Figure 12:
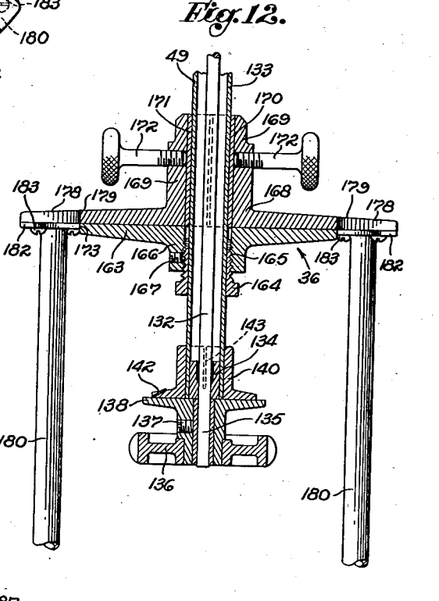
Fig. 12 is a fragmentary cross section taken as indicated by the line 12—12 of Fig. 11.
Figure 13:
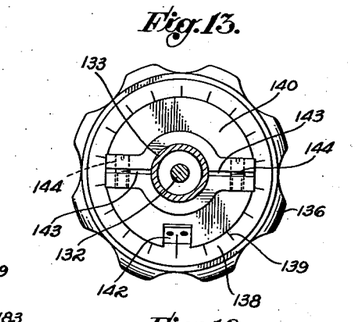
Fig. 13 is an enlarged cross section taken as indicated by the line 13—13 of Fig. 1.

The shaft member 60 which projects from the casing 62 has a latitude segment 119 secured thereon, this segment 119 having a latitude scale 120 of a range of slightly over 90°. An index plate 121 is secured to the arm 56 of the yoke 51. The segment 119 is mounted on the shaft 60 in such position that zero of the scale 120 will coincide with the index mark 122 of the member 121 when the axis A—A, Fig. 2, is disposed in a plane 90° from the axis of the sleeve 49, this being the position of the axis A—A when the navigator is being used at the equator or zero latitude. For rotation of the casing 62 on the axis defined by the shaft members 60 and 61, a gear segment 123 is fixed on the outer end of the shaft member 61. This gear segment 123 is engaged by an idler gear 124 supported by a journal 125 which is secured to the arm 57 of the yoke 51 by means of a plate 126. A shaft 127 is mounted in the lower part of the yoke 51, and on its outer end carries a gear 128 for driving the idler 124. The inner end of the shaft 127, as shown in Fig. 4, is supported by a bearing member 129 and has a worm gear 130 thereon engaged by a worm 131 mounted on the upper end of a vertical shaft 132, which shaft extends centrally within the sleeve 48 and the remaining parts of the column 49. The lower portion of this column 49 consists of a tube 133 and as shown in Fig. 12 has a bushing 134 at its lower end to provide a bearing for the lower portion of the shaft 132. The lower extremity 135 of the shaft 132 projects from the bearing 134, and a knob 136 is secured thereon by suitable means such as a set screw 137. Associated with the knob 136 is a flange 138 having graduations 139, Fig. 13, on the upper face thereof each representing a quarter-degree of rotation of the solar compass 34 on the lateral axis defined by the shaft members 60 and 61. The lower end of the tube 133 has a fitting 140 secured thereon providing an index member 142 relative to which the graduations 139 of the member 138 move when the shaft 132 is turned. The fitting 140 is provided with slots 143, and screws 144 traversing these slots are employed to clamp the fitting 140 on the lower end of the tube 133. The upper end of the tube 133 may be connected to the lower end of the sleeve 48 by means of a member 145, Fig. 2, having internal threads 146 for engagement with threads 147 on the lower end of the sleeve 48.

By means of a support 148 mounted on the wall 65, shown in Figs. 2, 8, and 9, a light dividing means 149 is secured within the casing 62 in a position centralized on the axis A—A. This light dividing means includes a bottom wall 150, a pair of opposed side walls 151, and a top wall 152 secured together by means of screws 153. Between the side walls 151 diagonal mirrors 154 and 155 are extended, these mirrors converging upwardly and lying in planes which intersect on the axis A—A and are each disposed at an angle of 45° to the axis A—A. At the outer edges of the mirrors 154 and 155, translucent walls 156 are supported as shown in Fig. 2. The upper wall 152 of the light dividing device has an opening 157 therein across which a translucent member or filter 158 is extended, as best shown in Figs. 8 and 9. By means of supports 159 mounted on the wall 65, photronic cells 160 and 161 are secured on opposite sides of the light dividing means and in positions adjacent the translucent walls 156. Cooperating with the supports 159 are spring clips 162 which are mounted on the front wall 69 of the casing 62 in positions to bear against the portions of the cells 160 and 161 disposed oppositely from the supports 159.

Figure 11:
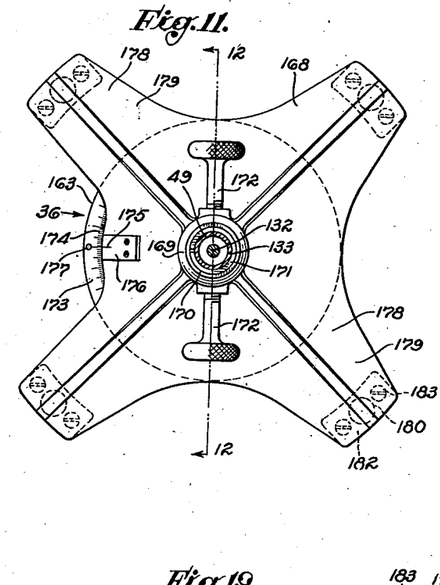
Fig. 11 is an enlarged cross section taken as indicated by the line 11—11 of Fig. 1.

As shown in Figs. 1, 11, and 12, a circular plate 163 is secured near the lower end of the tube 133. The plate 163 may be fixed rigidly on the tube 133 by use of a split bushing 164 which is threaded into a tapered opening 165 in a boss 166 which projects downwardly from the plate 163, and a set screw 167 may be provided to lock the member 164 in place. Above the plate 163, so as to rest upon the upper face thereof, a spider 168 is disposed around the tube 133, this spider 168 having an upwardly projecting boss 169 with a bore 170 in which a split sleeve 171 is placed so as to engage the tube 133. Clamping screws 172 are threaded through the boss 169 so as to engage the sleeve 171 to clamp the same on the tube 133 and thereby prevent rotation of the spider from a desired position. The peripheral portion 173 of the plate 163 is provided with a circle 174 graduated to degrees, and a reference mark 175 is provided on the spider 168 by use of a plate 176. The zero point 177 of the circle 174 is disposed in a plane which radiates from the axis defined by the column 49 and is disposed at an angle of 90° to the axis defined by the shaft members 60 and 61.

Figure 14:
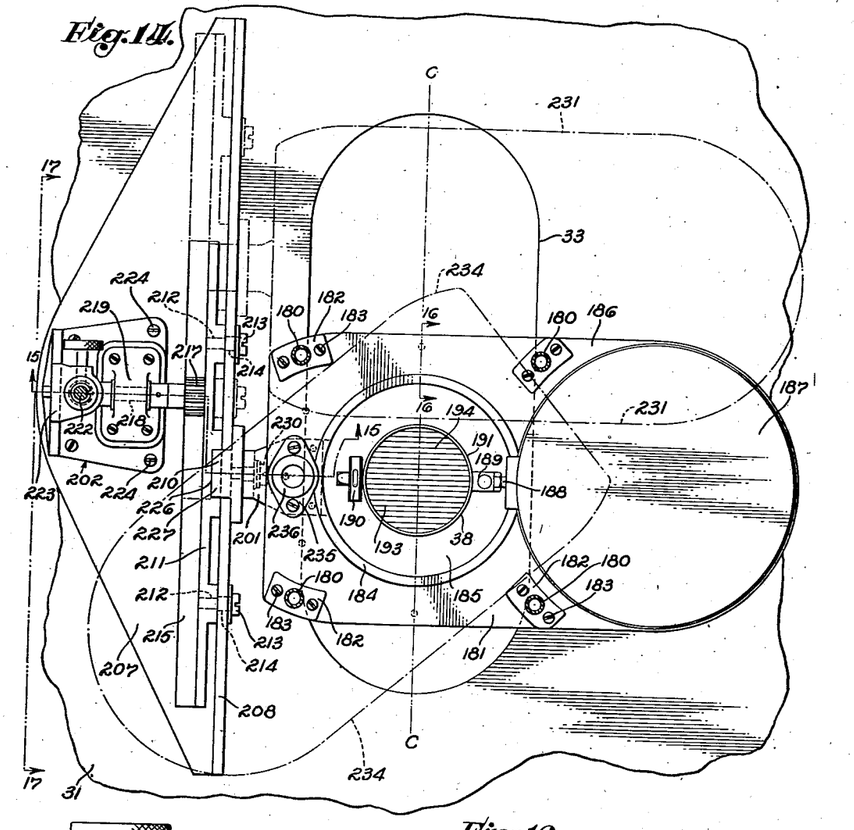
Fig. 14 is an enlarged cross section on a plane represented by the line 14—14 of Fig. 1.
Figures 15, 16:
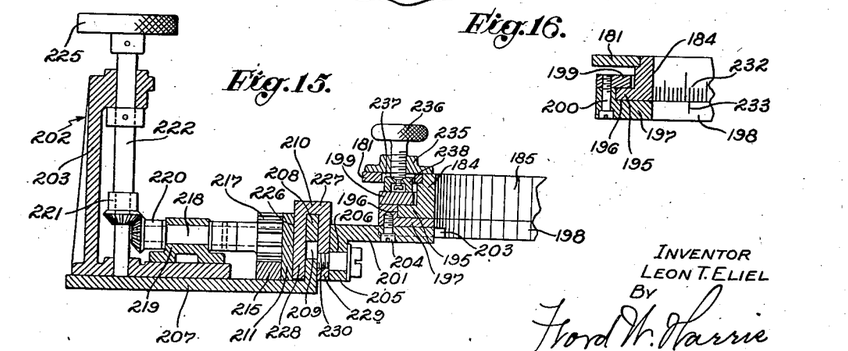
Fig. 15 is an enlarged fragmentary cross section taken as indicated by the line 15—15 of Fig. 14.
Fig. 16 is an enlarged fragmentary cross section taken as indicated by the line 16—16 of Fig. 14.
Figure 17:
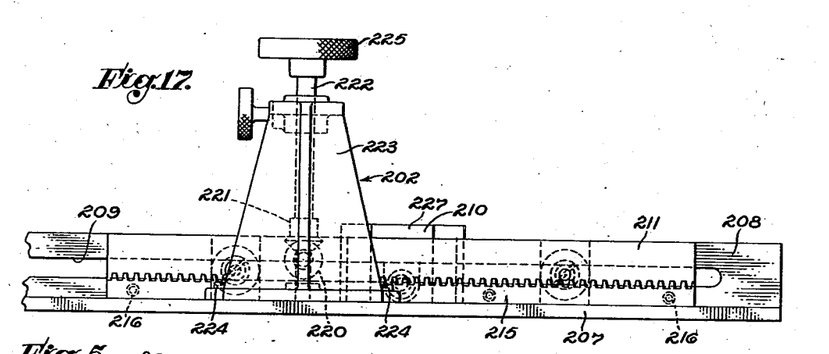
Fig. 17 is an enlarged elevational view taken from a position indicated by the line 17—17 of Fig. 14.

From the ends 178 of the arms 179 of the spider 168, bars 180 extend downwardly to a plate 181, Figs. 1 and 14, which is perpendicular to the axis of the column 49, plates 182 being provided on the upper and lower ends of the bars 180 whereby to connect such ends of the bars 180 by means of screws 183 respectively to the spider 168 and the plate 181. As shown in Figs. 14 to 16 inclusive, the plate 181 carries a ring 184 which provides an opening 185 through the plate, this opening 185 being preferably circular and aligned with the axis of the column 49. The extending portion 186 of the plate 181 carries a gyroscope 187, the details of which are not shown since gyroscopes and their characteristics are well known. The gyroscope has a shaft 188 which projects along and is rotatable upon an axis perpendicular to the axis defined by the column 49. This shaft 188 has a bracket 189 which carries the ground sight 38 and also has a level 190 thereon for observing or checking from time to time the level of the ground sight 38. As shown in Fig. 1, the ground sight 38 comprises a conical shell 191 having an objective lens 192. As shown in Fig. 14, the shell 191 has a translucent plate 193, such as ground glass, on which the lens 192 focuses an image of the terrain over which the flight is being made. This translucent plate or screen 193 has parallel lines 194 which are likewise parallel to the shaft 188 on which the ground sight is mounted. These parallel lines 194 when in their normal position are likewise parallel to a radial line or plane defined by the index mark 175 of the spider 168.

As shown in Figs. 15 and 16, the ring 184 has a flange 195 projecting outwardly from the lower portion thereof so as to engage an annular channel 196 formed in a guide ring 197 which is made from two parts, namely, a lower ring element 198 and an upper ring element 199, secured together by screws 200. The guide ring 197 is connected by means of a bracket 201 with a trimming device 202, shown in Figs. 1, 14, 15, and 17. As shown in Fig. 15, the outer portion of the bracket 201 is held in a recess 203 in the ring element 198 by screws 204, and the bracket has a vertical wall 205 with a vertically elongated opening 206 therein.

The trimming device 202 includes a base 207 having an upwardly directed wall 208 along one edge thereof, this wall 208 having a longitudinal slot 209 therein. The base 207 is secured to the floor 31 of the aerial vehicle at one side of the opening 33, and with the wall 208 parallel to the longitudinal axis or line of flight of the aerial vehicle. A traveling member or carriage 210 is mounted so as to slide along the wall 208. The carriage 210 comprises a bar 211 having threaded openings 212 receiving screws 213 which pass through the slot 209 of the wall 208, the body portions 214 of these screws sliding in the slots 209 and thereby guiding the movement of the bar 211. A rack 215 is secured to the lower edge of the bar 211, by use of rivets 216, and in a position to be engaged by a pinion 217 mounted on a shaft 218 carried by a bearing block 219 in a position parallel to the plate 207 and perpendicular to the wall 208. A bevel gear 220 mounted on the end of the shaft 218 opposite from the gear 217 is engaged by a bevel gear 221 fixed on a vertical shaft 222 carried by a bracket 223 which is secured to the plate 207 by means of screws 24. A knob 225 is secured to the upper end of the shaft 222 so as to rotate the same and to thereby transmit rotation through the bevel gears 221 and 220 to the shaft 218 which carries the gear 217 so that the gear 217 will move the rack 215, causing the carriage 210 to travel lengthwise of the opening 33 in the floor 31 of the aerial vehicle. The bar 211 has a vertical slot 226, and the carriage includes a vertically slidable block 227 which, as shown in Fig. 15, is of U-shaped form so as to provide a wall 228 which is vertically slidable in the slot 226 of the bar 211, and a plate 229 which rests against the rightward or outer face of the wall 208 and carries a screw 230 which passes through the opening 206 of the bracket 201. Due to its connection with the plate 181, the guide ring 197 swings on an arc around the axis defined by the shaft members 44 of the yoke 35. To permit such swinging movement of the guide ring 197 but to restrict the swinging movement thereof in a vertical plane extending lengthwise of the aerial vehicle and coinciding with the center line C—C through the opening 33, a trimming device 202 has been provided in which the block member 227 may move vertically in the slot 226 of the carriage 210, the block member 227 having the laterally directed screw 230 on which the bracket 201 may turn as the trimming device is employed to move the plate 181 between a position such as shown in full lines and a position indicated by dotted lines 231 in Fig. 14. The plate 181 and the ground sight 38 supported thereby may be rotated in the guide ring 197 from the position indicated in full lines in Fig. 14 to other positions such as suggested by dotted lines 234, as required in the operation of the device to be later explained. This rotation will produce a like rotation of the column 49 and the sun compass 34 on the axis of the column 49 owing to the rigid connection of parts as hereinbefore described. To show the amount of rotation of the plate 181 and the ground sight 38 relative to the lengthwise plane defined by the line C—C, a scale 232, graduated in degrees, may be inscribed in the ring 184 which is secured to the plate 181, and an index mark 233 may be provided in the ring element 198 of the guide ring 197. A plate 235, carrying a locking screw 236, is mounted on the plate 181 in such position that the screw 236 will extend through an opening 237 in the plate and press a cup-shaped shoe 238 against the ring element 199 of the guide ring 197.

Figure 19:
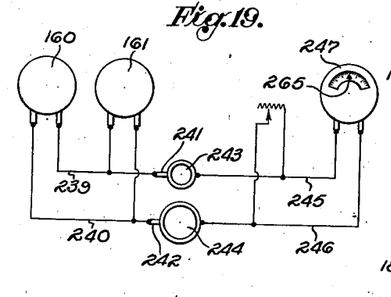
Fig. 19 is an electrical diagram showing the photronic cells and their connection with a galvanometer.

As shown in Fig. 19, the photronic cells 160 and 161 are connected in opposing relation to conductors 239 and 240 which connect through brushes 241 and 242 and contact rings 243 and 244 with conductors 245 and 246 which extend to an electro-sensitive indicator, such as a galvanometer 247. As shown in Figs. 2, 3, and 4, the contact rings 243 and 244 are mounted in an annular insulating member 248 carried in the upper face of the bottom wall 39 of the yoke 35, and terminal screws 249 and 250, Fig. 3, are provided for connecting the conductors 245 and 246. The brushes 241 and 242 are carried in brackets 251 mounted on the lower member 53 of the yoke 51.

Figure 20:
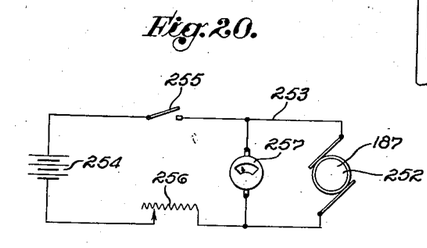
Fig. 20 is an electrical diagram of the hook-up for the gyroscope.

As shown in the electrical diagram, Fig. 20, the gyroscope 187 includes a motor 252 included in a circuit 253 with a source of electric current such as a battery 254 when a switch 255 is closed. A rheostat 256 is provided in the circuit 253 for control of electrical energy to the motor 252, and a voltmeter 257 is connected in parallel with the circuit 253 to show the voltage applied to the motor under control of the rheostat 256.

Figure 18:
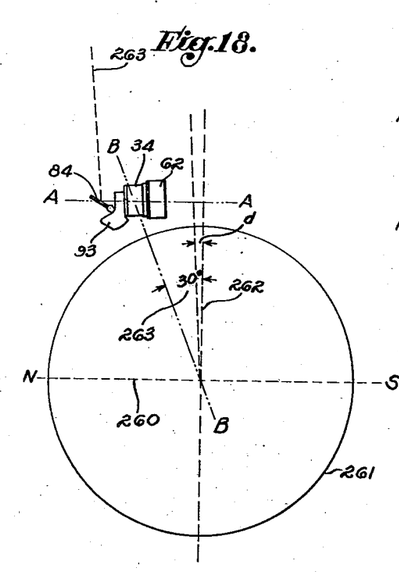
Fig. 18 is a diagrammatic view illustrating conditions involved in the use of my invention.

The operation of the navigator will be understood from the following. Before the flight is started, the cooperating parts are adjusted to positions governed by conditions under which the flight is to be made. For example, the sun compass 34 is swung on the lateral axis defined by the shaft members 60 and 61 to a position governed by the latitude, or mean latitude, of the course contemplated for the flight, so that when the axis A—A of the sun compass is pointing in true polar direction, for example, true north, it will likewise be parallel to the axis 260 of the earth 261 indicated in the diagrammatic view, Fig. 18. For example, if the mean latitude of the course is 30° north of the equator 262, as indicated at 263 in Fig. 18, the sun compass will be set to a position at an angle of 60° from the axis B—B, Fig. 1, as illustrated in Fig. 1, this setting of 30° being indicated on the latitude scale 120. The sun's rays may at the season of the year during which the flight is made have a north declination indicated by the angle $d$. If such is the case, the mirror 84 must be set in accordance with this declination by moving the lever arms 89 associated with the mirror 84 relative to the declination scale 93 into the proper position in accordance with the declination $d$. The mirror 84 is then set for longitude, which is done by setting the clock to solar time for the location at which the photographic operations are conducted. This is done by determining the standard time of the standard time section in which the location is included, and then computing the solar time of the location by adding thereto or subtracting therefrom, as the case may be, in accordance with the distance of the location from the meridian on which the standard time of the section is based and in accordance with the existing equation of time value obtained from the Solar Ephemeris tables. Then, at noon, with the axis A—A pointing north and also parallel to the axis 260 of the earth, the sun's rays 263 will be reflected by the mirror 84 into the casing of the sun compass along the axis A—A, providing that the reflecting face of the mirror 84 is disposed perpendicular to a plane which coincides with the axes A—A and 260. Furthermore, as the earth 261 rotates, the clock 66 will rotate the mirror support in contrary direction so that the mirror 84 will continue to point at the sun, or, in other words, will continue to be perpendicular to a plane coinciding with the axis A—A and passing through the sun. Therefore, as long as the foregoing conditions are maintained, the sun's rays will be reflected by the mirror 84 along the axis A—A into the interior of the sun compass casing 62; but should the sun compass 34 be rotated from the previously prescribed position, for example, on the axis B—B so that the axis A—A will swing from true north, the sun's rays reflected by the mirror 84 will not pass into the sun compass 34 along the axis A—A but will be deflected to one side or the other of the axis A—A in accordance with the direction in which the axis A—A is displaced. This will result in more light striking one of the diagonal reflectors 154—155 than strikes the other of such reflectors, with the result that one of the photronic cells 160—161 will receive more light than the other and will accordingly produce a greater flow of current in the circuit including the galvanometer 247, with the result that the indicator 265 of the galvanometer 247, Fig. 19, will be moved to one side of the central position in which it is shown in Fig. 19, thereby indicating the fact that the sun compass has been rotated from its true north position. The galvanometer 247 is preferably mounted in the control chamber, or cockpit of the aerial vehicle, in view of the pilot to indicate to him the need for a change in the direction of travel of the aerial vehicle, and likewise the approximate magnitude and direction of the needed change in travel of the aerial vehicle.

The setting of the mirror support 75 for longitude, or so that the mirror 84 will point at the sun, is accomplished by setting the clock 66 by rotation of the knob 67. The clock 66 is connected to the mirror support through the gear means previously described, in such relation that when the clock reads 12 noon, the mirror support will be in a position 90° rotated from the position in which it is shown in Fig. 2, or in a position substantially as shown in Fig. 1, wherein the face of the mirror 84 will be parallel to the axis defined by the shaft members 60 and 61 and consequently perpendicular to a plane which is in turn perpendicular to the axis D—D. Therefore, at 12 noon, actual time, the mirror will point directly at the sun if the clock likewise reads 12 noon, and will also point at the sun at any time during the day provided the reading of the clock shows the solar or actual time, which may be readily computed, and also provided that the axis A—A points true north and is parallel to the axis of the earth and also the mirror 84 is set for the existing declination of the sun.

The direction of the course to be followed will then be set on the scale 173 of the member 163. If the direction of the flight in the northern hemisphere is to be true north, the scale 173 will be set at zero, as shown in Fig. 11. For other directions of flight, the member 168 will be set on the scale 173 in accordance with the angle and direction of flight relative to the previously mentioned true north flight. According to the foregoing, if the flight is to be conducted southwardly along a true north and south line, the solar compass 34 and the course checking means 37 will be in the correlative positions in which they are shown in Fig. 1; but, during the time the aerial vehicle is headed in the direction of true south, the roof 30, the floor 31, the yoke 35, the yoke supporting means, and the trimming means 202 will be rotated 90° around the axis B—B for the reason that at this time the center line C—C will extend in the same direction as the axis A—A of the sun compass 34, or, in other words, will be in the same vertical plane as the axis A—A.

Assuming now that the airplane is flying south and is truly following its prescribed true north to south course without drifting, the image appearing on the screen or plate 193 of the ground sight 38 will move parallel to the lines 194. In other words, an object of the image which is observed to lie upon one of the lines 194 of the screen 193 will move along such line 194 so long as the airplane is on its course. Should the airplane move over the ground in any direction other than the desired course, the observed object of the image will move at an angle relative to the line on which it was originally observed. The observer or navigator, noting the drift of the object from the desired line of movement on the screen 193, will rotate the course checking means 37 to bring the lines 194 into a position parallel to the observed line of movement of the object on the screen. This rotation of the member 37 will cause a like rotation of the column 49 and the sun compass 34, with the result that the beam of light reflected by the mirror 84 will move to one side of the axis A—A and produce a signal or flow of electric energy which may be used in the control or directing of the flight of the aerial vehicle. In the preferred practice of the invention the movement of the beam of light to one side of the axis A—A changes the energization of the photronic cells and causes a flow of current through the galvanometer 247 so that the indicator 265 thereof will move to one side of its central position, thereby indicating to the pilot that the direction of travel of flight should be changed. The galvanometer 247 is preferably connected with the cells 160 and 161 in such a manner that the direction of movement of the indicator 265 from central position will indicate the direction in which the flight is in error. The pilot then slowly turns the airplane until the galvanometer 247 reads 0.

Atmospheric conditions are not ordinarily such that the longitudinal center line of the airplane may be maintained on the line of flight, but as a general rule winds or air currents will be encountered which are diagonal to the intended line of flight, with the result that the longitudinal center line of the airplane must be oriented to compensate for the drift of the air currents or winds. However, as the center line C—C, Fig. 14, is rotated or swung from one side to the other of the prescribed course, the course checking means 37 and the remaining parts of the navigator which are rigidly secured thereto will be rotated relative to the guide ring 197 so as to keep the lines 194 of the screen 193 parallel to the direction of movement of the image of the underlying terrain which appears on the scene 193. It will be perceived that in the flying of the airplane along a north to south course, eastward and westward winds will make it necessary to point the nose of the airplane respectively westwardly and eastwardly, which is a condition referred to as "crab". Other than for the normal functions of the pilot in operating the airplane and the acts of the navigator in observing the image on the screen 193 and rotating the course checking means 37, as previously described, the navigating device will automatically direct the flight of the airplane so as to produce a reasonably close adherence to the selected course.

As the latitude of the airplane changes, periodic adjustments of the latitude setting of the sun compass must be made. This is accomplished by rotation of the handwheel or knob 36 at the lower end of the column 49. If the course is such that the longitude of the airplane changes, periodic adjustment of the clock 66 must be made, so that the hands of the clock will indicate true solar time within prescribed limits. These adjustments of time and latitude are necessary to keep the mirror 84 in proper position to reflect rays from the sun along the axis A—A when the axis A—A is parallel to the axis of the earth. Adjustment of the mirror for declination of the sun need not be made oftener than once a day.

The sun compass may be regarded as a sun-pointer, the disposition of the pointer being in the direction of the received sunbeam. Since the pilot steers the aircraft in accordance with a continuously increasing or decreasing angle between the disposition of the received sunbeam and the direction of ground travel, it is apparent that my device incorporates a variable angle-defining means, one leg of which comprises the ground sight adapted for alignment with the direction of ground travel, and the second leg comprising the sun compass regarded as a pointer directed at the sun. The angle between the two legs is changed by the clock at a rate compensating for rotation of the earth, so that the disposition of the ground sight with respect to earth is constant so long as the other leg is kept aligned with the sun.

While the above described application of this invention pertains to the navigation of aircraft, the instrument may also be adapted to the navigation of other types of vehicles; and by utilizing a true north setting and a known declination and Greenwich time, the instrument obviously, with a slight change of the mirror and photronic cell disposition, could be used for determining the latitude and longitude of the point of observation. For example, in determining longitude and latitude, the device may be used in the following manner. Some suitable means, such as a gyroscope compass, for example, may be used to position the yoke 51 so that the axis A—A of the sun reference member will swing on a plane which coincides with the earth's axis, or, in other words, a vertical plane which also extends true north. The mirror 84 will be then adjusted for the proper declination of the sun and locked in this position by means of the screws 97 and 102. After this the sun compass 34 will be rotated on its horizontal axis D—D, and the mirror support 75 will be rotated on the axis A—A until rays of light received by the mirror 84 from the sun will be reflected along the axis A—A, which condition will be shown by a centralized position of the indicator 265 of the galvanometer 247. When the foregoing adjustments have been made, the scale 120 will indicate latitude and the clock 66 will show true solar time from which longitude may be readily determined by comparison with Greenwich time or standard time.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. In a navigator of the character described, for use in an aerial vehicle, the combination of: a ground reference member having means for adjusting it relative to the aerial vehicle and so as to follow a selected object on the ground as the aerial vehicle moves relative to the ground; a sun reference member connected to said ground reference member so as to be moved thereby, said sun reference member having means which correspond to a prescribed azimuth when said aerial vehicle is moving on its course; and photoelectric means operative by the sun's rays in response to the movement of said sun reference member from its prescribed azimuth position to give a sensible indication that said sun reference member has been so moved by said ground reference member.

2. In a navigator of the character described, for use in an aerial vehicle, the combination of: a sun compass adapted to receive rays from the sun; means for mounting said compass in said aerial vehicle so that said rays received from the sun will be in a prescribed position when said compass is in a prescribed position relative to north, and so that said rays will move out of said position when said compass is moved from its prescribed position; and means operative in response to the movement of said received sun rays out of said prescribed position to produce an indication of said movement thereof.

3. In a navigator of the character described, for use in an aerial vehicle, the combination of:

a sun compass adapted to receive rays from the sun; means for mounting said compass in said aerial vehicle so that said rays received from the sun will be in a prescribed position when said compass is in a prescribed position relative to north, and so that said rays will move out of said position when said compass is moved from its prescribed position; and means operative in response to the movement of said received sun rays out of said prescribed position to produce an indication, sensible to the pilot of the aerial vehicle, of said movement thereof.

4. In a navigator of the character described, the combination of: a sun compass having means for mounting it so as to move relative to horizontal and vertical axes; means for adjustably holding said sun compass at an angle to vertical selected in accordance with the latitude at which said compass is being used; a ground reference member; and means connecting said ground reference member to said compass.

5. In a navigator of the character described, the combination of: a sun compass; means for supporting said compass so that it will swing on a lateral axis; a second supporting means for supporting said first named supporting means so that it will rotate relative to a vertical axis; a ground reference member; and means for adjustably connecting said ground reference member to said last named supporting means.

6. In a navigator of the character described, the combination of: a sun compass; means for supporting said compass so that it will swing on a lateral axis; a second supporting means for supporting said first named supporting means so that it will rotate relative to a vertical axis; a ground reference member; and means for adjustably connecting said ground reference member to said last named supporting means, said connecting means including a device operating to automatically maintain said ground reference member level in at least one direction.

7. In a navigator of the character described, the combination of: a sun compass; means for supporting said compass so that it will swing on a lateral axis; a second supporting means for supporting said first named supporting means so that it will rotate relative to a vertical axis; a ground reference member; means for adjustably connecting said ground reference member to said last named supporting means, said ground reference member having a viewing element whereby the image of the ground is visible to an observer and having a reference mark viewed with the image of the ground and appearing to move relative to the ground, said ground reference member being also adjustable with relation to the ground by rotation thereof around said vertical axis whereby like rotation is imparted to said last named supporting means; and means cooperating with said compass to indicate its position.

8. A sun compass of the character described, including: a light receiving member; means for supporting said light receiving member so that it may move through a position wherein light rays from the sun will be received in a prescribed position in said light receiving member; light responsive means adjacent said prescribed position so as to receive rays entering said light receiving member; and indicating means associated with said light responsive means.

9. A sun compass of the character described, including: a light receiving member; means for supporting said light receiving member so that it may move through a position wherein light rays from the sun will be received in a prescribed position in said light receiving member; light responsive means adjacent said prescribed position so as to receive rays entering said light receiving member; and electrical indicating means connected to said light responsive means to show the energization thereof by sun's rays.

10. A sun compass of the character described, including: a light receiving member; means for supporting said light receiving member so that it may move through a position wherein rays from the sun will pass along an established path in said light receiving member; photronic cells lying on opposite sides of said established path; and electrical means connected to said photronic cells and indicating the state thereof.

11. A navigator of the character described, having in combination: variable angle-defining means having one leg for alignment with a direction of travel and a second leg for alignment with the sun; and means to vary the angle of said legs in compensation for rotation of the earth.

12. A navigator of the character described, having in combination: variable angle-defining means having one leg for alignment with a direction of travel and a second leg for alignment with the sun; means to vary the angle of said legs in compensation for rotation of the earth; and means to indicate deviation of said second leg from alignment with the sun.

13. A navigator of the character described, having in combination: variable angle-defining means having one leg for alignment with a direction of travel and a second leg for alignment with the sun; means to vary the angle of said legs in compensation for rotation of the earth; and photo-electric means responsive to the rays from the sun to indicate deviation of said second leg from alignment with the sun.

14. A navigator of the character described for craft, said navigator having in combination: a course determining means revolvably mounted on the craft; a sun-pointer revolvably related to said means and adapted to receive rays from the sun when aligned with the sun; means to rotate said sun-pointer relative to said course determining means at the rate of the earth's rotation in a direction to keep the compass direction of said course determining means constant so long as said pointer is aligned with the sun; and photo-electric means responsive to said rays to indicate to the pilot of the craft deviation of said sun-pointer from normal alignment with the sun.

15. A navigator of the class described for aircraft, said navigator having in combination: a course determining means revolvably mounted on the aircraft; a sun-pointer revolvably related to said means and adapted to receive rays from the sun when aligned with the sun; means to rotate said sun-pointer relative to said course determining means at the rate of the earth's rotation in a direction to keep the compass direction of said course determining means constant so long as said pointer is aligned with the sun; a ground sight movable into alignment with the direction of ground travel, said ground sight being operatively connected with said course determining means; and means to indicate to the pilot of the aircraft deviation of said sun-pointer from alignment with the sun.

16. A navigator of the class described for aircraft, said navigator having in combination: a course determining means revolvably mounted on the aircraft; a sun-pointer revolvably related to said means and adapted to receive rays from the sun when aligned with the sun; means to rotate said sun-pointer relative to said course determining means at the rate of the earth's rotation in a direction to keep the compass direction of said course determining means constant so long as said pointer is aligned with the sun; a ground sight connected with said course determining means whereby said course determining means may be aligned with the direction of ground travel; and photo-electric means responsive to said rays to indicate to the pilot of the aircraft deviation of said sun-pointer from normal alignment with the sun.

17. In a navigator of the character described: a member revolvable about an axis parallel with the axis of the earth; a mirror revolvable with said member to reflect a beam from the sun along the axis of the member; and means to revolve the member and mirror about said axis in compensation for rotation of the earth.

18. In a navigator of the character described: a member revolvable about an axis parallel with the axis of the earth; a mirror revolvable with said member to reflect a beam from the sun along the axis of the member; means to revolve the member and mirror about said axis in compensation for rotation of the earth; and remote means to indicate to a pilot deviation of said member from a position reflecting said beam along its axis.

19. In a navigator of the character described: a member revolvable about an axis parallel with the axis of the earth; a mirror revolvable with said member to reflect a beam from the sun along the axis of the member; means to revolve the member and mirror about said axis in compensation for rotation of the earth; and photo-electric means responsive to said beam to indicate deviation of said member from a position reflecting said beam along its axis.

20. A navigator of the character described for air-craft, said navigator having in combination: a course determining means revolvably mounted on the aircraft; a member revolvably related to said means and also revolvable about an axis parallel with the axis of the earth; a mirror revolvable with said member to reflect a beam from the sun along the axis of the member; means to revolve the member and mirror about said axis in compensation for rotation of the earth to keep the compass direction of said course determining means constant so long as said beam is reflected along the axis of said member; a ground sight movable into alignment with the direction of ground travel, said ground sight being operatively connected with said course determining means; and means to indicate to the pilot of the aircraft deviation of said member from a position reflecting said beam along its axis.

21. A navigator of the character described for aircraft, said navigator having in combination: a course determining means revolvably mounted on the aircraft; a member revolvably related to said means and also revolvable about an axis parallel with the axis of the earth; a mirror revolvable with said member to reflect a beam from the sun along the axis of the member; means to revolve the member and mirror about said axis in compensation for rotation of the earth to keep the compass direction of said course determining means constant so long as said beam is reflected along the axis of said member; a ground sight movable into alignment with the direction of ground travel, said ground sight being operatively connected with said course determining means; and photo-electric means responsive to said beam to indicate to the pilot of the aircraft deviation of said member from a position reflecting the beam along its axis.

LEON T. ELIEL.